US008824982B2

(12) United States Patent
Suh et al.

(10) Patent No.: US 8,824,982 B2
(45) Date of Patent: Sep. 2, 2014

(54) TIME-VARIANT ANTENNA ENABLED BY SWITCHED CAPACITOR ARRAY ON SILICON

(75) Inventors: Seong-Youp Suh, Portland, OR (US); Ricardo Suarez-Gartner, Oceanside, CA (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 13/534,377

(22) Filed: Jun. 27, 2012

(65) Prior Publication Data

US 2014/0004804 A1 Jan. 2, 2014

(51) Int. Cl.
*H04B 1/04* (2006.01)

(52) U.S. Cl.
USPC ........................................ 455/121; 455/193.1

(58) Field of Classification Search
USPC ......... 455/82, 83, 121, 129, 77, 193.1, 193.2, 455/193.3; 333/100, 101, 17.1; 334/47, 55
See application file for complete search history.

(56) References Cited

U.S. PATENT DOCUMENTS

| | | | | |
|---|---|---|---|---|
| 6,889,036 | B2 * | 5/2005 | Ballweber et al. | 455/292 |
| 7,539,465 | B2 * | 5/2009 | Quan | 455/121 |
| 8,106,829 | B2 * | 1/2012 | Rofougaran et al. | 343/700 MS |
| 8,145,142 | B2 * | 3/2012 | Rofougaran et al. | 455/78 |
| 8,406,686 | B2 * | 3/2013 | Tsushima et al. | 455/41.1 |
| 2006/0176777 | A1 | 8/2006 | Ihara | |
| 2008/0160929 | A1 | 7/2008 | Lee | |
| 2009/0021332 | A1 * | 1/2009 | Brekelmans et al. | 334/55 |
| 2011/0260806 | A1 | 10/2011 | Takeuchi | |
| 2013/0201067 | A1 * | 8/2013 | Hu et al. | 343/745 |

FOREIGN PATENT DOCUMENTS

| | | | |
|---|---|---|---|
| JP | 2002-064402 | A | 2/2002 |
| JP | 2003-018040 | A | 1/2003 |
| JP | 2007-243506 | A | 9/2007 |
| JP | 2008-035065 | A | 2/2008 |
| KR | 10-2011-0033059 | A | 3/2011 |
| WO | 2013089790 | A1 | 6/2013 |
| WO | 2014/004131 | A1 | 1/2014 |

OTHER PUBLICATIONS

Manteghi, Majid, "A Switch-Band Antenna for Software-Defined Radio Applications", IEEE Antennas and Wireless Propagation Letters, vol. 8, 2009, pp. 3-5.
Manteghi, Majid, "Antenna Miniaturization Beyond the Fundamental Limits Using Impedance Modulation", IEEE APS Charleston, Jun. 2009, 4 pages.
Manteghi, Majid, "Non-LTI Systems, a New Frontier in Electromagnetics Theory", IEEE APS Toronto, Jul. 2010, 4 pages.
Peregrine Semiconductor, "Peregrine Semiconductor Unveils Digitally Tunable Capacitors", Variable capacitors enable frequency-agile Tunable Networks, San Diego, California, Jun. 8, 2011, 3 pages.

(Continued)

*Primary Examiner* — Sonny Trinh
(74) *Attorney, Agent, or Firm* — Carrie A. Boone, P.C.

(57) ABSTRACT

A time-variant antenna is disclosed that uses a switched capacitor array in silicon to improve the performance and integration options of the time-variant antenna. Parasitic effects of the interface between the on-board antenna and on-silicon switched capacitor array are considered and the antenna is tuned to compensate for these effects. The switched capacitor array provides high linearity, lower cost, and reduced size, relative to prior art antenna implementations.

20 Claims, 10 Drawing Sheets

(56) References Cited

OTHER PUBLICATIONS

Suh, et al., "Wireless Communication Device Using Time-Variant Antenna Module", International Patent Application No. PCT/US2011/065629, filed on Dec. 16, 2011, 21 pages.

International Search Report and Written Opinion received for PCT Patent Application No. PCT/US2011/065629, mailed on Sep. 28, 2012, 9 pages.

International Search Report and Written Opinion received for Patent Application No. PCT/US2013/045956, mailed on Sep. 26, 2013, 13 pages.

* cited by examiner

TIME-VARIANT ANTENNA ENABLED BY SWITCHED CAPACITOR ARRAY ON SILICON

TECHNICAL FIELD

This application relates to antennas and, in particular, to a switched capacitor array implemented on silicon.

BACKGROUND

Antennas are used in a variety of devices to transmit electrical currents, converted into radio waves, to a remote device that also has an antenna. Antennas come in many types, but each one has a metallic surface for radiating and receiving the electromagnetic energy. Recently, antennas are even being embedded into printed circuit boards.

Typically, antennas are designed to send and receive signals within a particular range of frequencies. An antenna designed for broadband use may not necessarily be suited to a narrowband device. Despite this limitation, some antennas may be adjusted to operate under different applications.

A simplified system 100 with a prior art antenna 44 is depicted in FIG. 1. The antenna 44 is connected to a transceiver 40, which converts electrical signals to radio waves, making them suitable for transmission over air. Likewise, the transceiver converts received radio waves into electrical signals. The antenna 44 is also connected to a varactor 46 and a waveform generator 42.

The waveform generator 42 drives the varactor 46 (a variable capacitor), which adjusts the properties of the antenna 44 so as to change the resonant frequencies and the antenna bandwidth in which the antenna operates. This makes the antenna 44 more flexible in its operation, but the waveform generator 42 and varactor 46 also increase the cost, size, and complexity of the system 100. In addition to this, an off-the-shelf variable capacitor is a non-linear device, which has the potential to generate undesired intermodulation in the transceiver 40.

Thus, there is a continuing need for a time-variant antenna that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a time-variant antenna is disclosed that uses a switched capacitor array in silicon to improve the performance and integration options of the time-variant antenna. Parasitic effects of the interface between the on-board antenna and on-silicon switched capacitor array are considered and the antenna is tuned to compensate for these effects. The switched capacitor array provides high linearity, lower cost, and reduced size, relative to prior art antenna implementations.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

The time-variant antenna (TVA) is disclosed in United States Patent Application No. PCT/US2011/065629, entitled, "Wireless Communication Device Using Time-Variant Antenna Module", filed on Dec. 16, 2011. The TVA design provides several benefits over prior art antenna designs, not the least of which is a significant improvement in performance. However, the non-linearity of the waveform generator 42 and varactor 46 (FIG. 1) may cause intermodulation in the transceiver 40, an undesirable property of the prior art system 100.

Figure 2:
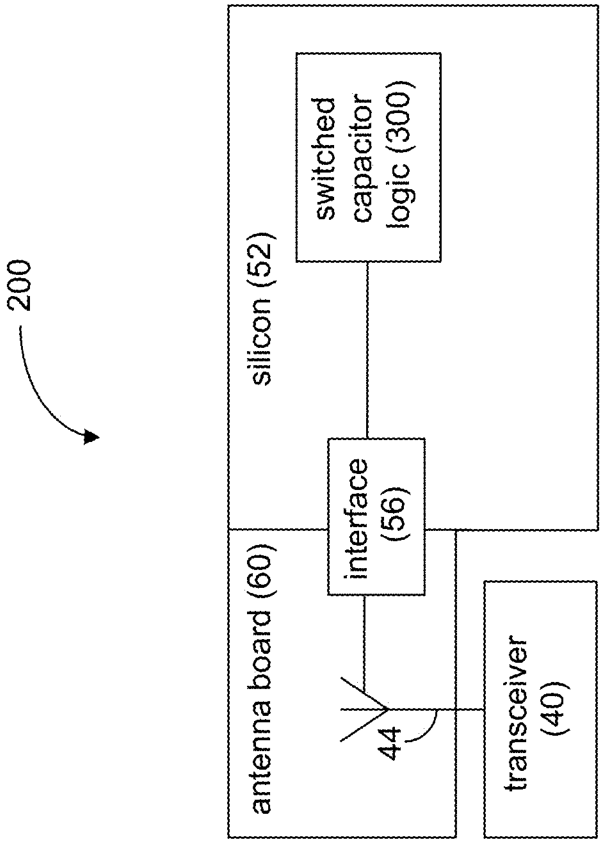
FIG. 2 is a simplified block diagram of a system using a time-variant antenna enabled by a switched capacitor array, according to some embodiments.

A novel time-variant antenna system 200 is depicted in FIG. 2, according to some embodiments. The system 200 includes an antenna board 60 and silicon substrate 52, connected by an interface 56. The antenna board 60 includes the antenna 44, which is connected to the transceiver 40. A switched capacitor logic unit 300 is disposed on the silicon 52. The switched capacitor logic 300 replaces the varactor 46 and waveform generator 42 of the prior art system 100. The switched capacitor logic 300 includes a switched capacitor array of parallel capacitors 58 driven by control logic input, which is described in more detail below. In some embodiments, the time-variant antenna system 200 provides high linearity, low cost, and reduced size, relative to the prior art system 100.

Figure 3:
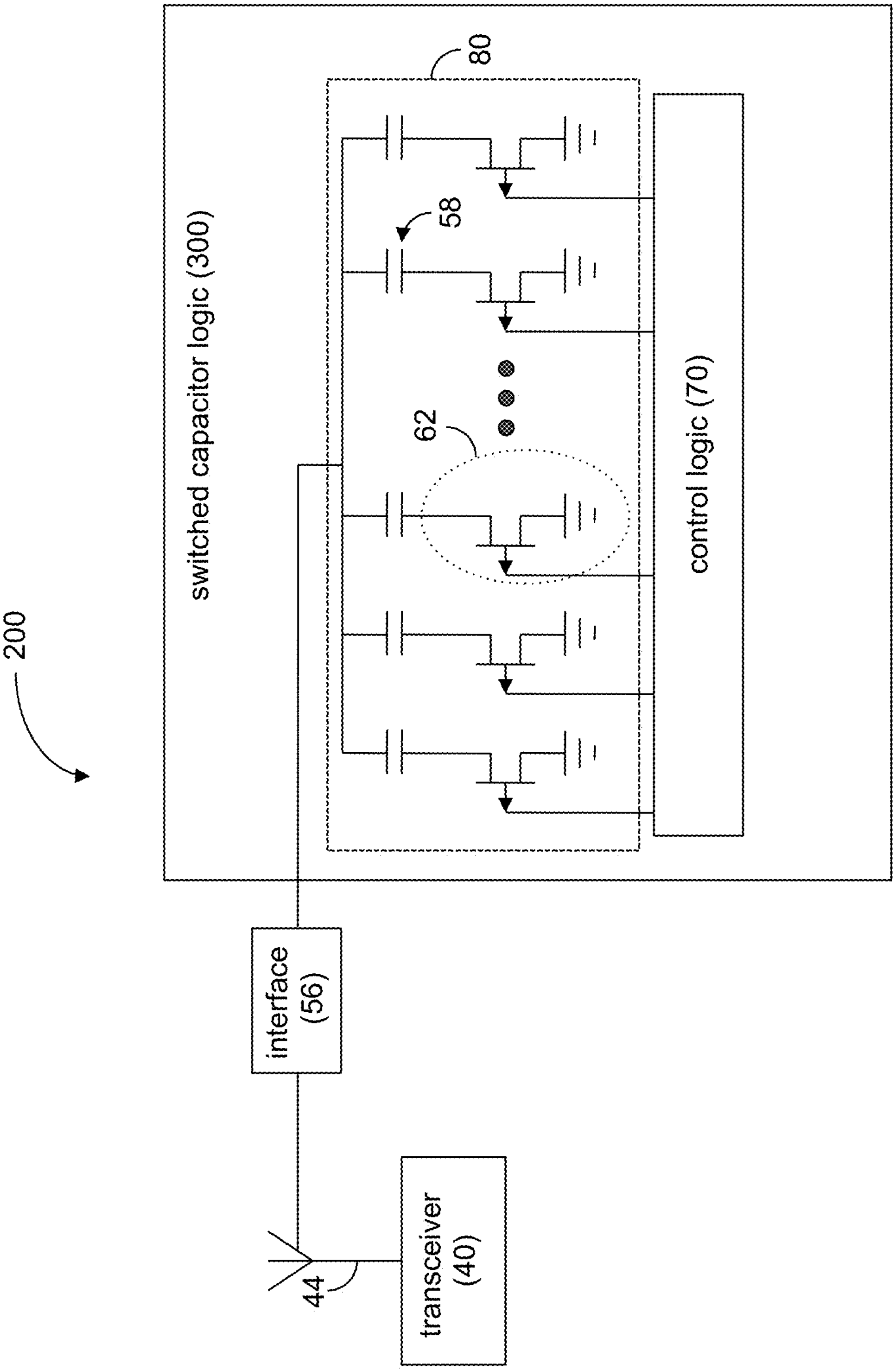
FIG. 3 is detailed diagram of the time-variant antenna system of FIG. 2, according to some embodiments.

FIG. 3 is a detailed diagram of the time-variant antenna system 200 of FIG. 2, according to some embodiments. The switched capacitor logic 300 consists of control logic 70 and a capacitor array 80, which consists of N switchable capacitors 58 for integer N, as well as N switches 62. The control logic 70 is able to independently turn on or turn off each capacitor 58 in the capacitor array 80 by activating or deactivating its respective switch 62.

In some embodiments, the number of switched capacitors 58 is determined based on how much resolution is needed for a given application. The control logic 70 may thus configure the capacitor array 80 such that one or more of its capacitors 58 is enabled, with the remaining capacitors in the capacitor array being dormant. Further, the control logic 70 turns on or off the enabled capacitors, as needed, to create the desired capacitance variation for a given application. Thus, the control logic 70 both 1) enables or disables the capacitors 58 within the capacitor array 80 and 2) is able to turn on or off the enabled capacitors, based on the desired capacitance.

Figure 1:
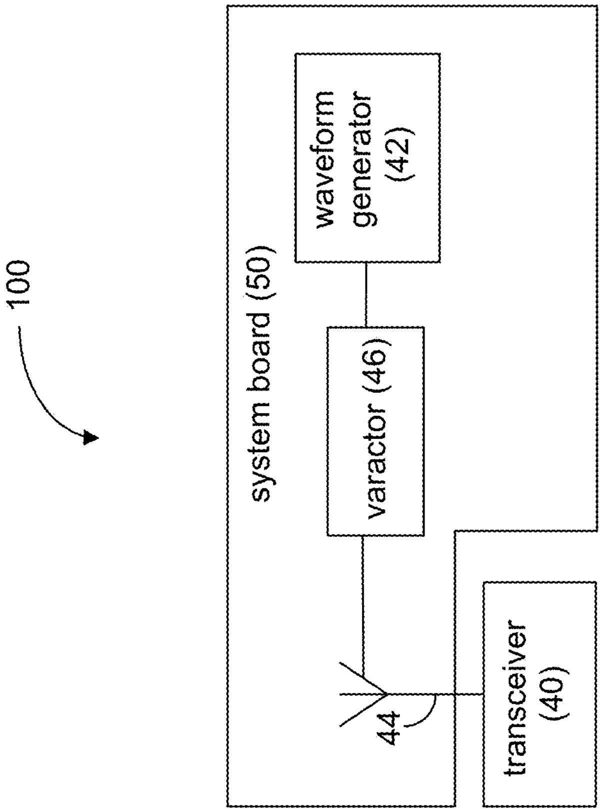
Figure 1 (prior art)
FIG. 1 is a simplified block diagram of a system using an antenna, according to the prior art.

In some embodiments, the switched capacitor logic 300 is able to generate various forms of capacitor variation in digital format via a simple register within the control logic 70, obviating the need for the waveform generator 42 and varactor 46 (FIG. 1). In some embodiments, this implementation reduces the cost and size of the system 200, while maintaining similar or better performance than the prior art solution. As radio functions are being integrated into single chip or package solutions with more conventional digital functions, the time-variant antenna system 200 is well suited to such implementations. Further, the time-variant antenna system 200 design may also enable self-calibration or compensation to offset part-to-part variation of the capacitor array and antenna elements.

As illustrated in FIG. 2, the switched capacitor logic 300 of the time-variant antenna system 200 is implemented in silicon 52. A parasitic effect is thus likely in the interface 56 between the antenna 44 (on the antenna board 60) and the switched capacitor logic 300 (on the silicon 52).

Each switched capacitor consists of the capacitor 58 and its respective switch 62, which, in some embodiments, is a transistor element. There are different kinds of switched capacitors that may be used in the switched capacitor array 80. For example, metal oxide semiconductor (MOS) capacitors, metal finger capacitors (MFCs), and metal insulator metal (MIM) capacitors are all available as switched capacitors. Each type of capacitor has different characteristics, so a selection of one type may be made in view of considerations such as performance, size, and cost.

One of the characteristics of a switched capacitor is that it is linear in nature. Thus, replacing the varactor 46 with the switched capacitor logic 300 eliminate the potential intermodulation issues that occur with the former, in some embodiments. Typically the switched capacitor elements provide a capacitance/area of about 3.3 fF/$\mu m^2$ (e.g., MIM capacitor).

To support wireless communications, such as LTE, cellular, WiFi, WiMAX, and so on, the time-variant antenna 44 will need a capacitance range of about 1-30 pF for antenna tunability. Therefore, a total required area for the switched capacitor for these applications is be only 8820 $\mu m^2$ (example: 42 $\mu$m×210 $\mu$m) approximately when N=5, that is, there are five switched capacitor elements 58 in the array 80. Thus, in some embodiments, the switched capacitor array 80 occupies an extremely small space in the silicon 52. The five switched capacitor elements 58 generate 31 different states ($2^5-1$), which provides the resolution of the prior art implementation, using less space.

Figure 4:
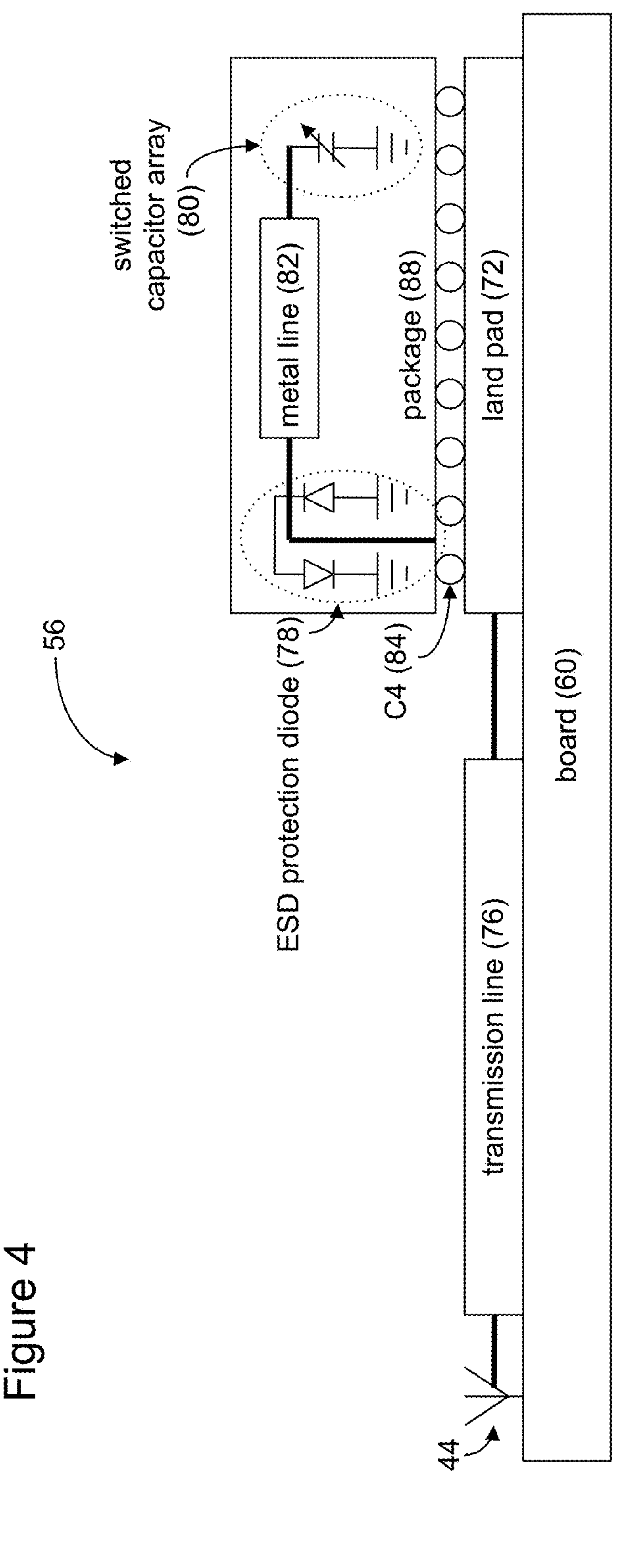
FIG. 4 is a schematic diagram of the interface 56, according to some embodiments.

Since this switched capacitor is implemented in silicon, in some embodiments, the parasitic effect that may be generated along the interface 56 between the antenna 44 and the switched capacitor logic 300 is considered. FIG. 4 is a schematic diagram depicting different elements or entities of the interface 56 to be considered when studying parasitic effects, according to some embodiments. The switched capacitor array 80 is connected to the antenna 44 through a transmission line 76, a land pad 72, a controlled collapse chip connection (C4) 84, an electrostatic discharge (ESD) protection diode 78, and a metal line 82. Each of these elements is considered in the itemized circuit model of FIG. 5, below.

The ESD protection diode 78 is included to protect the switched capacitor array 80 from an electrostatic discharge. In some embodiments, the capacitance of the ESD diode 78 is approximately 220 fF. The impedance values of the other interface elements for one implementation of the time-variant antenna system 200 are summarized in Table 1, below. In Table 1, the transmission line is a micro-strip line and the metal line has a length of approximately 100 $\mu$m. In some embodiments, the effect of the metal line impedance may be minimized if the switched capacitor array 80 is designed next to the solder bumps (not shown), the C4 84, and the ESD protection diode 78.

TABLE 1 estimated impedance values of interface 56

| interface | resistance, R | inductance, L | capacitance, C |
|---|---|---|---|
| transmission line 76 | NA | $L_1$ = 7.5 nH/inch | $C_1$ = 3 pF/inch |
| land pad 72 | NA | NA | $C_L$ = 0.2~0.4 pF |
| C4 84 | NA | $L_2$ = 500 pH | $C_2$ = 0.2 pF |
| ESD protection diode 78 | NA | NA | $C_3$ = 220 fF |
| metal line 82 | R = 17 ohm | $L_4$ = 4.83 fH | $C_4$ = 25.3 fF |
| simplified circuit model | $R_p$ = 16.4 ohm | $L_p$ = 15.5 nH | $C_p$ = 3.77 pF |

Figure 5:
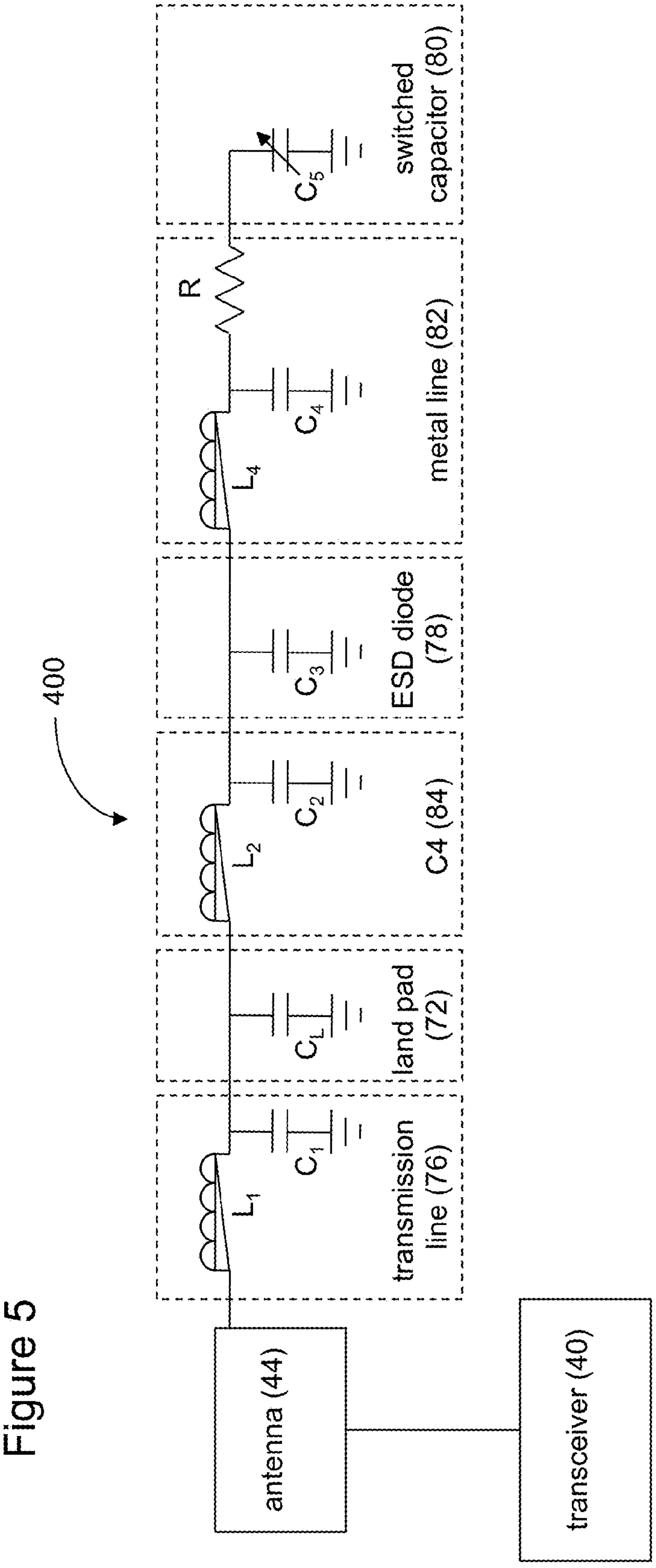
FIG. 5 is an itemized circuit model of the parasitic elements found in FIG. 4, according to some embodiments.
Figure 6:
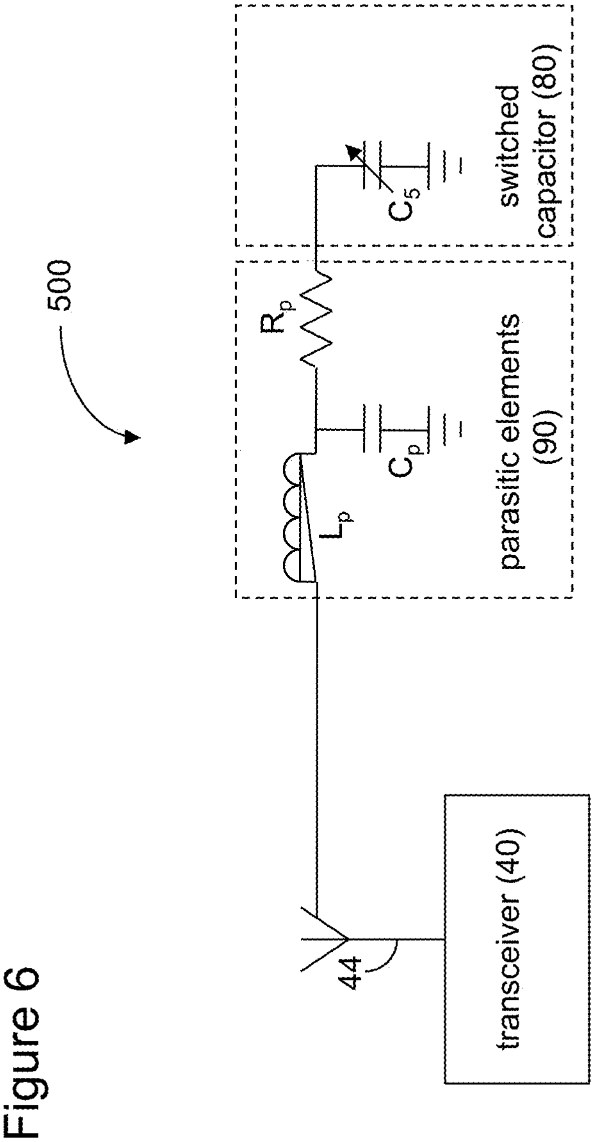
FIG. 6 is a simplified circuit model of the parasitic elements found in FIG. 4, according to some embodiments.

The above parasitic elements are also depicted as an itemized circuit model 400 in FIG. 5, and its simplified model 500 in FIG. 6, according to some embodiments. In FIG. 5, between the switched capacitor array 80 and the antenna 44 are disposed the potentially parasitic elements, the transmission line 76, the land pad 72, the C4 84, the ESD diode 78, and the metal line 82. The transmission line 76 provides inductance, $L_1$, and capacitance, $C_1$, the land pad 72 provides capacitance, $C_L$, the C4 84 provides inductance, $L_2$ and capacitance, $C_2$, the ESD diode 78 provides capacitance, $C_3$, and the metal line 82 provides inductance, $L_4$, capacitance, $C_4$, and resistance, R.

In the simplified circuit model 400 (FIG. 6), the above potentially parasitic elements are depicted merely as parasitic elements 90 having an inductance, $L_p$, a capacitance, $C_p$, and a resistance, $R_p$. In some embodiments, during a simulation of the time-variant antenna system 200, the parasitic inductance, capacitance, and resistance were measured, and are given in Table 1.

In some embodiments, the parasitic effect in the design of the time-variant antenna system 200, as shown in FIGS. 5 and 6, is considered when controlling the antenna from the switched capacitor array 80. This is possible even though the parasitic elements are located on the board 60 while the switched capacitor array 80 is on the silicon 52. Thus, in some embodiments, where the antenna frequency response is to be adjusted, the additional parasitic element values, $L_p$, $C_p$, and $R_p$, are also considered.

Figure 7:
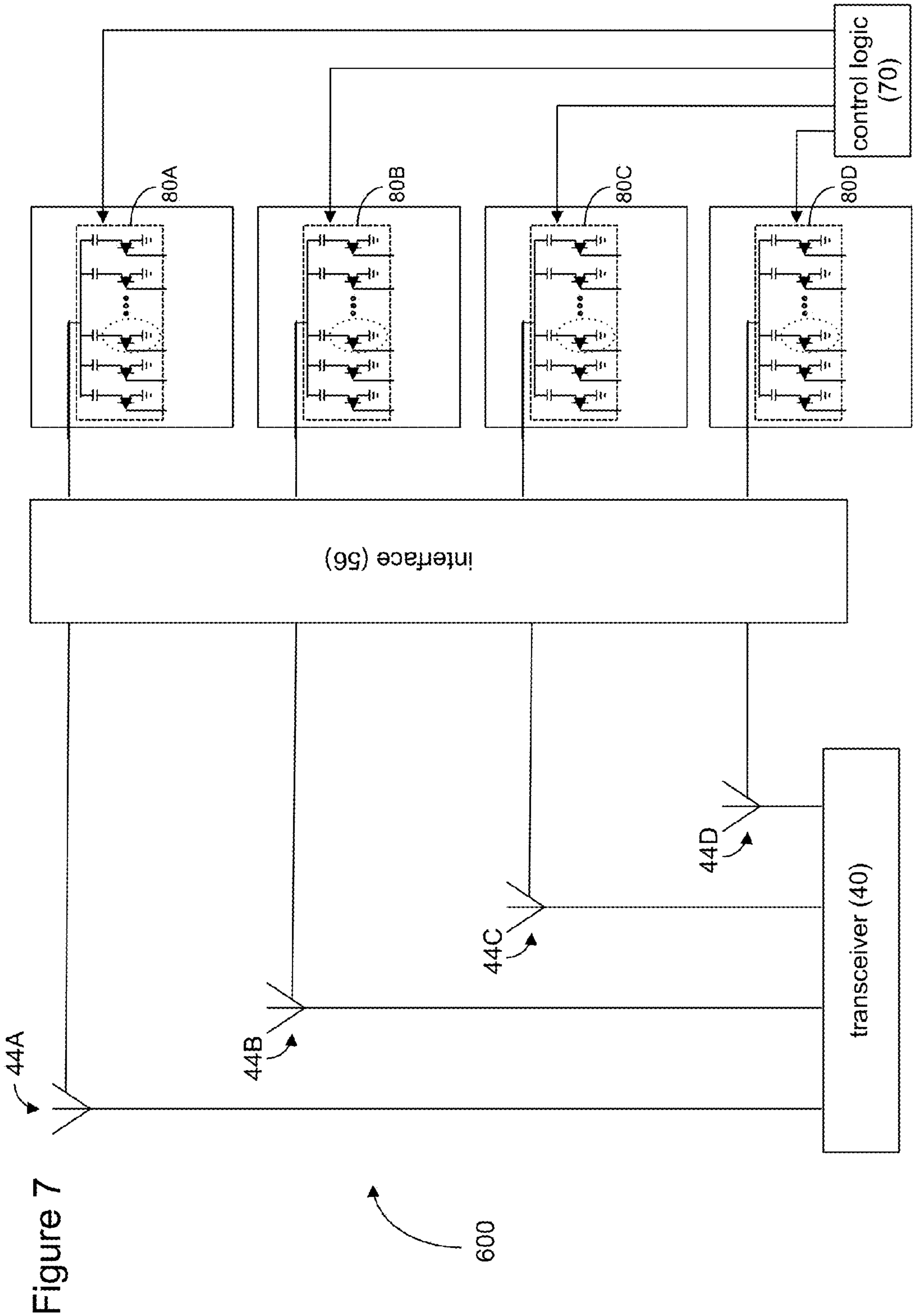
FIG. 7 is a simplified block diagram of a multi-antenna system using time-variant antennas enabled by switched capacitor arrays, according to some embodiments.

In some applications, the transceiver 40 may be coupled to multiple antennas, known as multiple-input-multiple-output (MIMO) systems. The time-variant antenna system 200 may operate in a multiple antenna environment. For example, where the transceiver 40 is coupled to four antennas, a separate switched capacitor array 80 is dedicated to each antenna, as depicted in FIG. 7, according to some embodiments. The control logic 70 controls each of the separate arrays 80A, 80B, 80C, and 80D, as needed to control the frequency range of their respective antennas 44A, 44B, 44C, and 44D.

Figure 8:
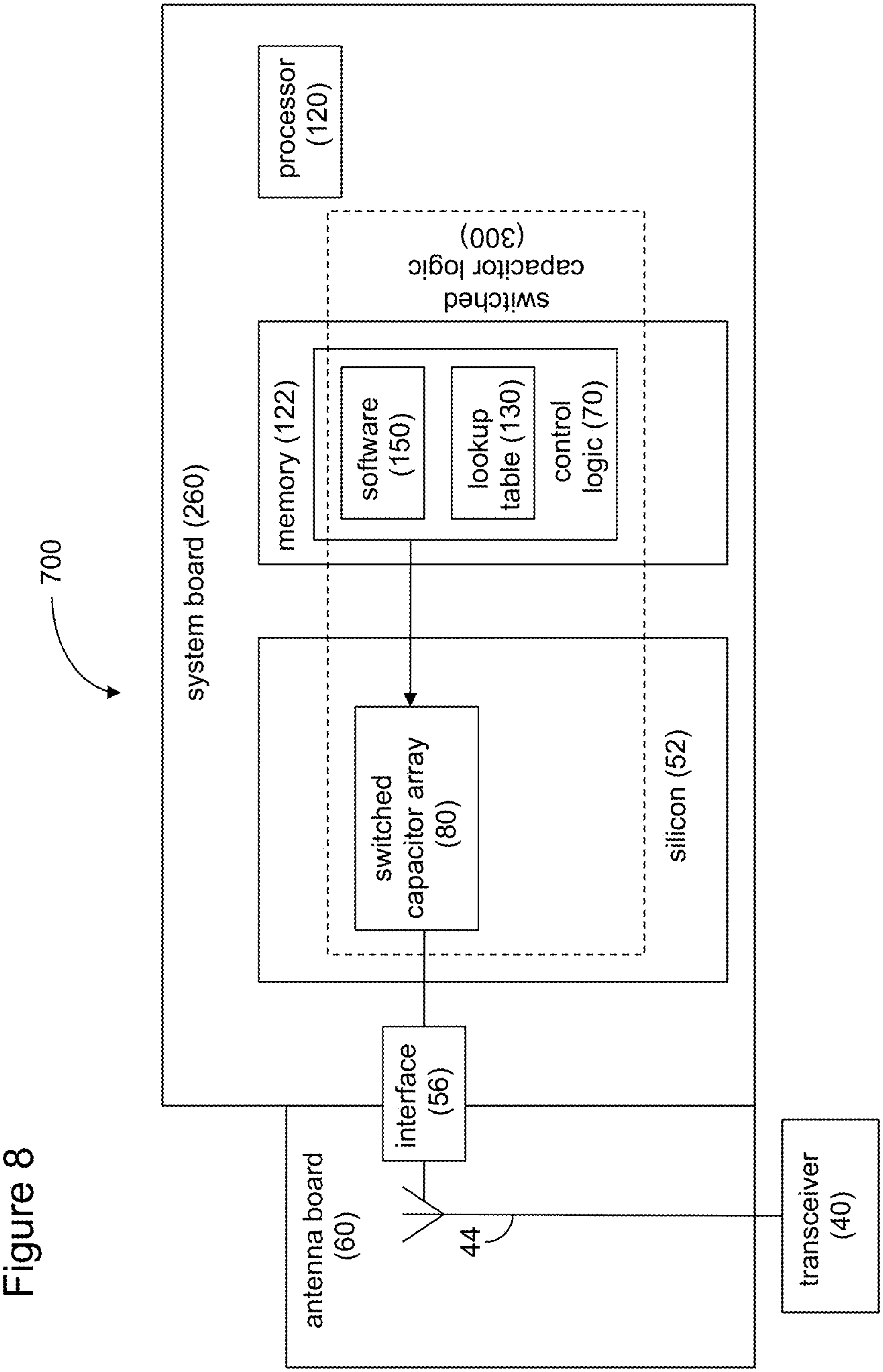
FIG. 8 is a simplified block diagram of a processor-based system implementing the time-variant antenna enabled by the switched capacitor array of FIG. 2, according to some embodiments.

FIG. 8 is a simplified block diagram of a processor-based system 700 implementing the time-variant antenna system 200 of FIG. 2, according to some embodiments. The processor-based system 700 may be a laptop computer, a mobile telephone, a personal digital assistant, or other wireless device. A system board 260 of the processor-based system 200 includes a central processing unit (CPU) or processor 120 and a memory 122. In some embodiments, the control logic 70 is implemented as a software program 150 and a lookup table 130, with the software being loaded into the memory 122 and executed by the processor 120. In some embodiments, the software 150 controls the switches 62 in the switched capacitor array 80, which, in turn, enables or disables the respective capacitor 58 within the array, thus tuning the antenna 44. The switched capacitor array is part of a silicon substrate 52 disposed on the system board 260, while the antenna 44 is on the antenna board 60. In some embodiments, the lookup table 130 contains parasitic effects data such as that found in Table 1, above, such that the control logic 70 is able to intelligently tune the antenna 44 to compensate for the parasitic effects.

Figure 9:
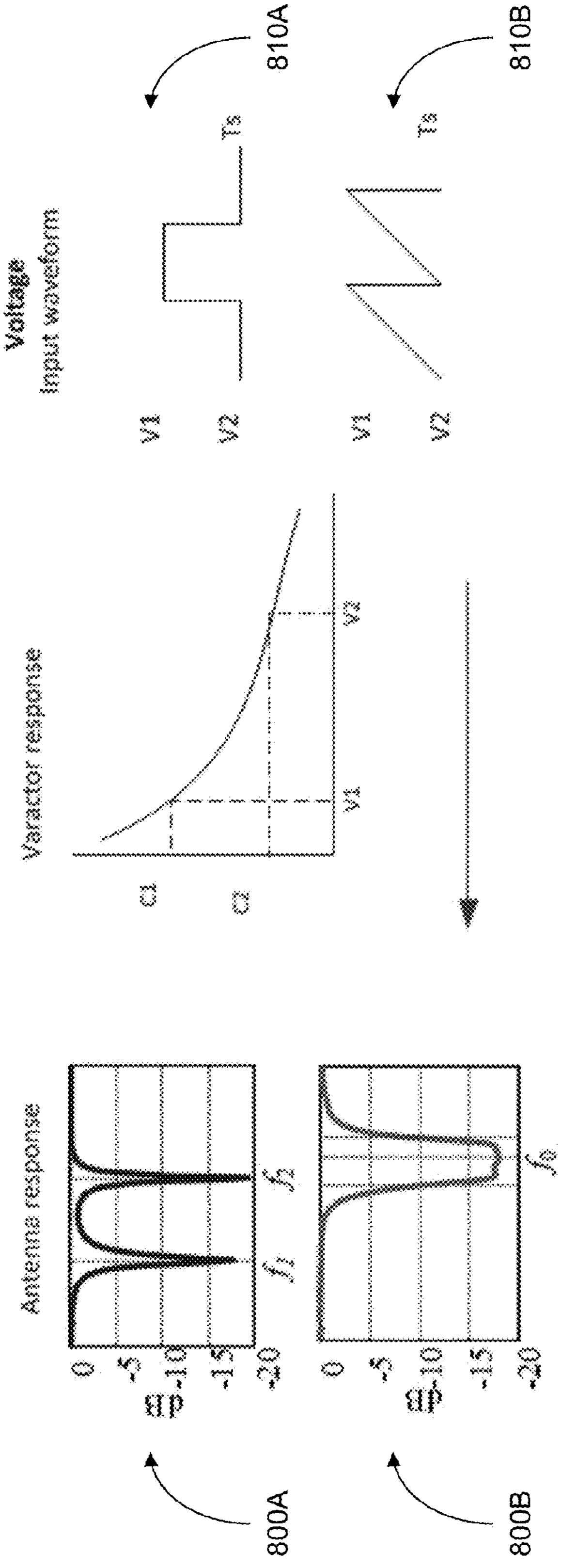
FIG. 9 is a simplified diagram showing the antenna response for the system of FIG. 1, according to some embodiments.
Figure 10:
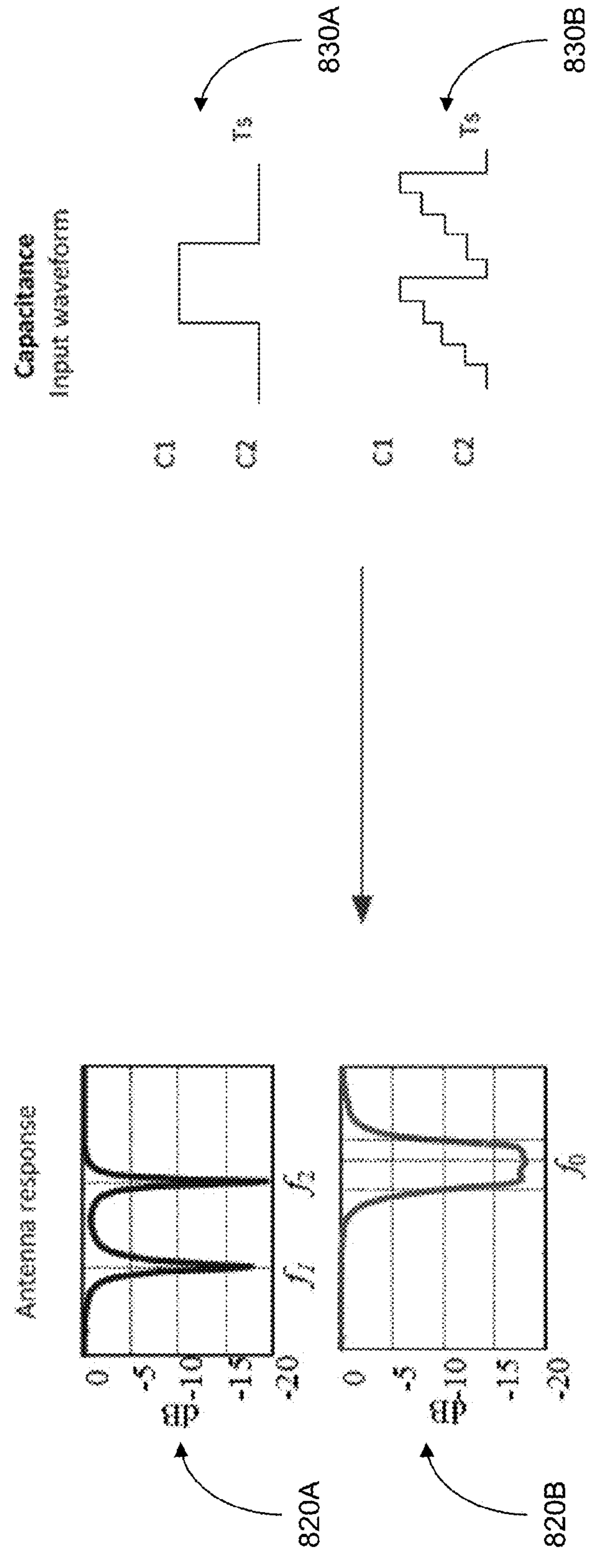
FIG. 10 is a simplified diagram showing the antenna response for the time-variant antenna system of FIG. 2, according to some embodiments.

FIGS. 9 and 10 are diagrams comparing the antenna response obtained using a prior art antenna system versus the antenna system 200, according to some embodiments. In FIG. 9, the varactor-based antenna system 100 (FIG. 1) generates two different antenna responses, 800A and 800B, resulting from square wave 810A and sawtooth 810B voltage inputs, respectively. In FIG. 10, two capacitance input waveforms, 830A and 830B, are generated by the time-variant antenna system 200, to emulate the voltages 810A and 810B, respectively. The antenna responses, 820A and 820B, are substantially similar to the antenna responses 800A and 800B, respectively.

Thus, the time-variant antenna system 200 optimally includes the switched capacitor logic 300, as described above, in some embodiments, to reduce cost and size significantly, without a loss of functionality. The linearity of the time-variant antenna 44 is enhanced with the switched capacitor array 300, thanks to its linear characteristics, in some embodiments. The number of capacitors 58 making up the switched capacitor array 80 may be determined based on its applications and the desired frequency range of the antenna 44. Further, where possible, the switched capacitor array 80 may include enabled and dormant capacitors, for maximum flexibility of operation and applications.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A time-variant antenna system, comprising:
- an antenna coupled to a transceiver, the antenna being disposed upon an antenna board, wherein the antenna comprises a frequency response;
- a switched capacitor logic coupled to the antenna through an interface, wherein the switched capacitor logic is disposed upon a silicon surface, the switched capacitor logic further comprising:
  - a plurality of capacitors;
  - a plurality of switches, wherein each switch is coupled between a ground and its respective capacitor of the plurality of capacitors; and
  - a control logic to enable or disable a switch of the plurality of switches; and
- an interface disposed between the board and the silicon, the interface comprising a parasitic effect, wherein the control logic tunes a frequency range of the antenna in view of the parasitic effect;

wherein the switched capacitor logic controls the frequency response of the antenna.

2. The time-variant antenna system of claim 1, wherein the plurality of switches and the plurality of capacitors comprise metal-oxide semiconductor devices.

3. The time-variant antenna system of claim 1, wherein the plurality of capacitors comprise metal finger devices.

4. The time-variant antenna system of claim 1, wherein the plurality of capacitors comprise metal-insulator-metal devices.

5. The time-variant antenna system of claim 1, wherein the parasitic effect comprises:
- parasitic resistance;
- parasitic inductance; and
- parasitic capacitance.

6. The time-variant antenna system of claim 1, wherein the interface further comprises:
- a transmission line comprising a parasitic inductance and a parasitic capacitance.

7. The time-variant antenna system of claim 1, wherein the interface further comprises:
- a land pad comprising a parasitic capacitance.

8. The time-variant antenna system of claim 1, wherein the interface further comprises:
- a controlled collapse chip connection comprising a parasitic inductance and a parasitic capacitance.

9. The time-variant antenna system of claim 1, wherein the interface further comprises:
- an electrostatic discharge diode comprising a parasitic capacitance.

10. The time-variant antenna system of claim 1, wherein the interface further comprises:
- a metal line comprising a parasitic inductance, a parasitic capacitance, and a parasitic resistance.

11. The time-variant antenna system of claim 1, wherein the switched capacitor logic comprises five capacitors and five switches;
- wherein the control logic adjusts the frequency range of the antenna to one of thirty-one possible states.

12. The time-variant antenna system of claim 1, wherein the switched capacitor logic comprises N capacitors and N switches, for integer N;
- wherein the control logic adjusts the frequency range of the antenna to one of $2^N-1$ possible states.

13. A time-variant antenna system, comprising:
- an antenna coupled to a transceiver, the antenna being disposed upon an antenna board, wherein the antenna comprises a frequency response;
- a switched capacitor logic coupled to the antenna through an interface, wherein the switched capacitor logic is disposed upon a silicon surface, the switched capacitor logic further comprising:
  - a plurality of capacitors;
  - a plurality of switches, wherein each switch is coupled between a ground and its respective capacitor of the plurality of capacitors; and
  - a control logic to enable or disable a switch of the plurality of switches;
- a second antenna coupled to the transceiver, the second antenna being disposed upon the antenna board; and
- a second switched capacitor logic device coupled to the second antenna, the second switched capacitor logic device being disposed upon the silicon surface and coupled to the second antenna via the interface;

wherein the switched capacitor logic controls the frequency response of the antenna and the second switched capacitor logic device tunes the frequency range of the second antenna.

14. A switched capacitor logic unit disposed on a silicon substrate, the switched capacitor logic unit comprising:

a plurality of capacitors arranged in a parallel array;

a plurality of switches, wherein each switch is coupled between a ground and its respective capacitor in the parallel array; and a control logic to enable or disable one or more switches of the plurality of switches;

wherein the switched capacitor logic tunes a frequency range of an antenna disposed on an antenna board while considering a parasitic effect of an interface between the parallel array and the antenna;

wherein the interface is selected from a group consisting of:

a transmission line comprising a parasitic inductance and a parasitic capacitance;

a land pad comprising a parasitic capacitance;

a controlled collapse chip connection comprising a parasitic inductance and a parasitic capacitance;

an electrostatic discharge diode comprising a parasitic capacitance; and a metal line comprising a parasitic inductance, a parasitic capacitance, and a parasitic resistance.

15. The switched capacitor logic unit of claim 14, wherein the parallel array comprises five capacitors and the plurality of switches comprises five switches;

wherein the control logic adjusts the frequency range of the antenna to one of thirty-one possible states.

16. The switched capacitor logic unit of claim 14, wherein the parallel array comprises N capacitors and the plurality of switches comprises N switches, for integer N;

wherein the control logic adjusts the frequency range of the antenna to one of $2^N-1$ possible states.

17. The switched capacitor logic of claim 14, the control logic further comprising:

a software program to be loaded into a memory and to be executed by a processor;

wherein the software program enables and disables the capacitors in the parallel array.

18. The switched capacitor logic of claim 14, the control logic further comprising:

a lookup table comprising parasitic effects data for one or more components in the interface between the parallel array and the antenna;

wherein the parasitic effects data comprises parasitic resistance, parasitic capacitance, and parasitic inductance.

19. A processor-based system disposed on a system board, the processor-based system comprising:

a central processing unit (CPU);

a memory coupled to the CPU;

an antenna coupled to a transceiver; and a switched capacitor logic unit, the switched capacitor logic unit comprising:

a plurality of capacitors arranged in a parallel array;

a plurality of switches, wherein each switch is coupled between a ground and its respective capacitor in the parallel array; and a control logic to enable or disable one or more switches of the plurality of switches, the control logic comprising:

a software program to be loaded into the memory and executed by the processor; and a lookup table comprising parasitic effects data about one or more elements of the interface;

wherein the switched capacitor logic tunes a frequency range of the antenna while considering a parasitic effect of an interface between the parallel array and the antenna.

20. The processor-based system of claim 19, wherein the lookup table comprises parasitic effects data for:

a transmission line comprising a parasitic inductance, $L_1$, and a parasitic capacitance, $C_1$;

a land pad comprising a parasitic capacitance, $C_L$;

a controlled collapse chip connection comprising a parasitic inductance, $L_2$, and a parasitic capacitance, $C_2$;

an electrostatic discharge diode comprising a parasitic capacitance, $C_3$;

a metal line comprising a parasitic inductance $L_4$, a parasitic capacitance, $C_4$, and a parasitic resistance, R.

* * * * *

UNITED STATES PATENT AND TRADEMARK OFFICE

CERTIFICATE OF CORRECTION

PATENT NO. : 8,824,982 B2
APPLICATION NO. : 13/534377
DATED : September 2, 2014
INVENTOR(S) : Seong-Youp Suh et al.

It is certified that error appears in the above-identified patent and that said Letters Patent is hereby corrected as shown below:

In the Claims

In column 7, line 39, in claim 17, after “logic” insert -- unit --.

In column 8, line 3, in claim 18, after “logic” insert -- unit --.

Signed and Sealed this
Sixth Day of January, 2015

Michelle K. Lee
*Deputy Director of the United States Patent and Trademark Office*